United States Patent [19]

van Ruiten

[11] Patent Number: 5,728,981
[45] Date of Patent: *Mar. 17, 1998

[54] POWER STEERING ATTENUATION HOSE CONSTRUCTION AND METHOD OF MAKING THE SAME

[75] Inventor: Matthew van Ruiten, Farmington Hills, Mich.

[73] Assignee: Dayco Products, Inc., Dayton, Ohio

[*] Notice: The term of this patent shall not extend beyond the expiration date of Pat. No. 5,539,164.

[21] Appl. No.: 653,577

[22] Filed: May 24, 1996

Related U.S. Application Data

[62] Division of Ser. No. 354,398, Dec. 12, 1994, Pat. No. 5,539,164.
[51] Int. Cl.$^6$ .................................................. F16K 47/02
[52] U.S. Cl. ................................... 181/233; 138/30
[58] Field of Search ........................ 181/233, 227, 181/207, 208; 60/469; 138/26, 30

[56] References Cited

U.S. PATENT DOCUMENTS 3,323,305  6/1967  Klees ................................. 181/207
5,094,271  3/1992  Fritz et al. ......................... 138/30
5,475,976  12/1995  Phillips ............................ 60/469
5,495,711  3/1996  Kalkman et al. ................ 181/227 X Primary Examiner—Khanh Dang
Attorney, Agent, or Firm—Joseph V. Tassone

[57] ABSTRACT

A power steering attenuation hose construction and method of making the same are provided, the hose construction comprising an outer flexible hose unit having an inlet end and an outlet end, a restrictor unit disposed in the outer hose unit and dividing the interior of the outer hose unit into an inlet chamber and an outlet chamber interconnected by the restrictor unit, a first flexible tuning cable unit being interconnected to the inlet end and being disposed in the inlet chamber, and a second flexible tuning cable unit being interconnected to the restrictor unit and being disposed in the outlet chamber, each of the tuning cable units having an open outlet end spaced from the outlet end of its respective chamber, the ratio of the effective length of the first tuning cable unit to the effective length of the second tuning cable being approximately 3 to 2 or higher.

11 Claims, 2 Drawing Sheets

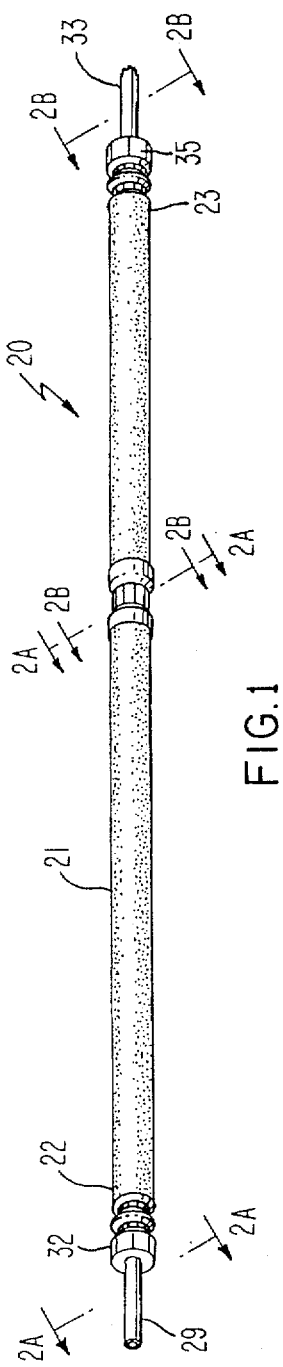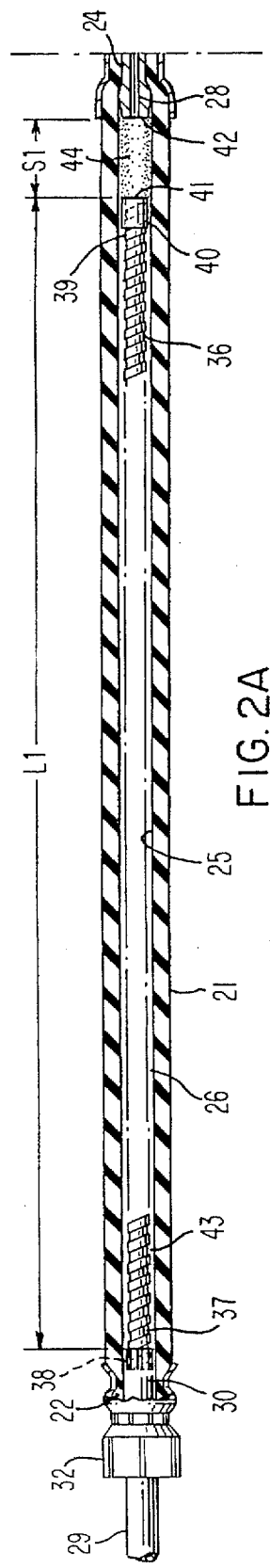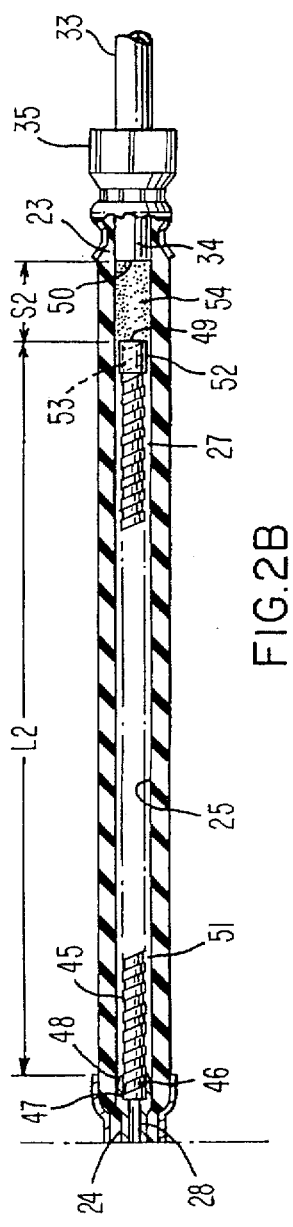
FIG.1
FIG.2A
FIG.2B

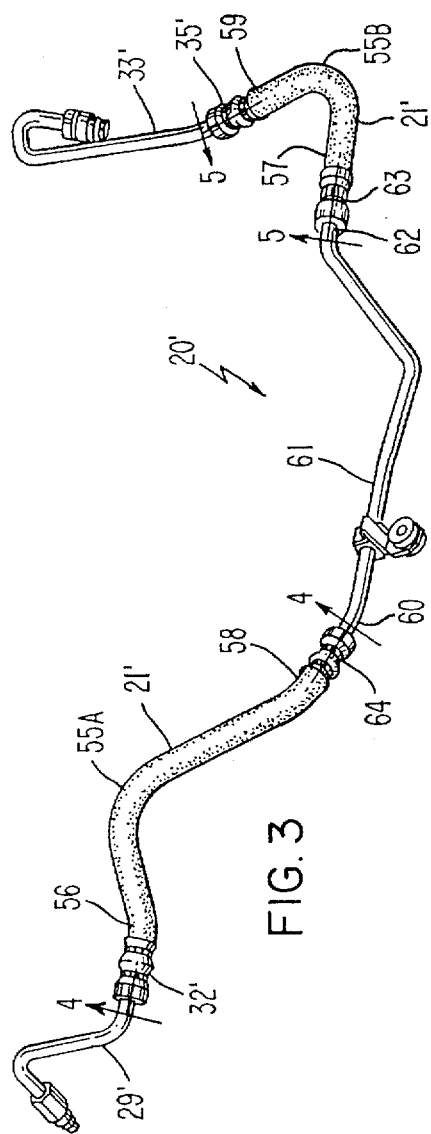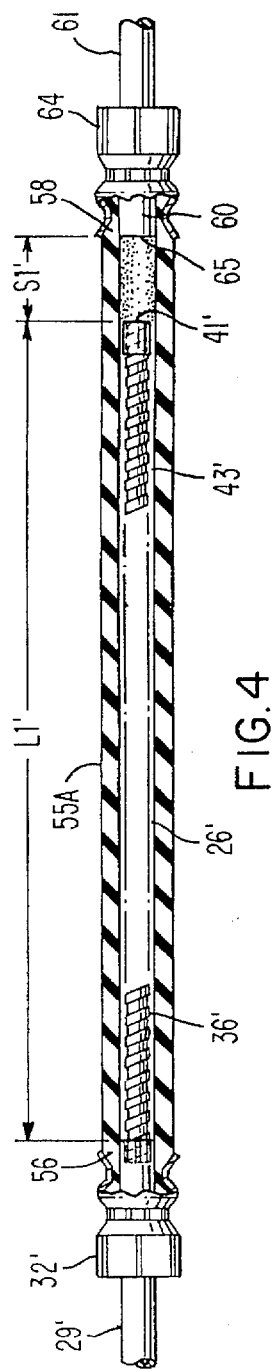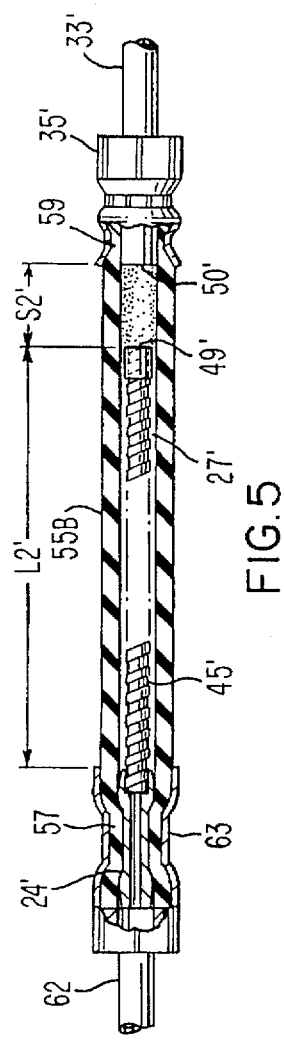

5,728,981

POWER STEERING ATTENUATION HOSE CONSTRUCTION AND METHOD OF MAKING THE SAME

CROSS REFERENCE TO RELATED APPLICATIONS

This application is a divisional patent application of its parent application, Ser. No. 354,398, filed Dec. 12, 1994, now U.S. Pat. No. 5,539,164.

BACKGROUND OF THE INVENTION

1. Field of the Invention

This invention relates to a new power steering attenuation hose construction and to a new method of making such a power steering attenuation hose construction.

2. Prior Art Statement

It is known to provide a power steering attenuation hose construction comprising an outer flexible hose means having an inlet end and an outlet end, restrictor means disposed in the outer hose means and dividing the interior of the outer hose means into an inlet chamber and an outlet chamber interconnected together by the restrictor means, each of the chambers having an inlet end and an outlet end, a first flexible tuning cable means being interconnected to the inlet end and being disposed in the inlet chamber, and a second flexible tuning cable means being interconnected to the restrictor means and being disposed in the outlet chamber, each of the tuning cable means having an open outlet end spaced from the outlet end of its respective chamber, the ratio of the effective length of the first tuning cable means to the effective length of the second tuning cable being approximately 1 to 1.

SUMMARY OF THE INVENTION

It is one of the features of this invention to provide a new power steering attenuation hose construction which has improved attenuation of the noise and/or vibration shudder produced by the power steering fluid of vehicles that are being parked or unparked at idle or very low speeds of movement thereof, such as by barely moving into and out of a parking space or the like while the wheels of the vehicle are being turned by the power steering mechanism.

In particular, it is known that when a vehicle such as a transportation vehicle is having the wheels thereof turned by the power steering mechanism of the vehicle during a parking operation of the vehicle, substantial noise and/or vibration (shudder) is produced by the fluid passing through the power steering mechanism from the fluid pump thereof to the effective steering structure whereby some means is provided to attenuate such noise and/or shudder.

For example, see the U.S. Patent to Klees, U.S. Pat. No. 3,323,305 wherein a single tuning cable means is utilized in a hose construction in the power steering system to attenuate the noise and/or shudder created by the pumped power steering fluid whereby this U.S. patent is being incorporated into this disclosure by this reference thereto.

As previously stated, it is known to utilize two such tuning cable means in series in the hose construction means.

However, it was found according to the teachings of this invention that if the two tuning cable means have a certain ratio in the effective lengths thereof improved attenuation of the noise and/or shudder is produced.

In particular, the prior known power steering hose construction that has two tuning cables disposed therein in series has a ratio of approximately 1 to 1 for the effective lengths of the tuning cables thereof.

However, it was found according to the teachings of this invention that the ratio of the effective length of the first tuning cable means to the effective length of the second tuning cable means should be approximately 3 to 2 or higher wherein the second tuning cable means may be disposed downstream or upstream from the first tuning cable means.

For example, one embodiment of this invention comprises a power steering attenuation hose construction comprising an outer flexible hose means having an inlet end and an outlet end, restrictor means disposed in the outer hose means and dividing the interior of the outer hose means into an inlet chamber and an outlet chamber interconnected together by the restrictor means, each of the chambers having an inlet end and an outlet end, a first flexible tuning cable means being interconnected to the inlet end and being disposed in the inlet chamber, and a second flexible tuning cable means being interconnected to the restrictor means and being disposed in the outlet chamber, each of the tuning cable means having an open outlet end spaced from the outlet end of its respective chamber, the ratio of the effective length of the first tuning cable means to the effective length of the second tuning cable means being approximately 3 to 2 or higher.

Accordingly, it is an object of this invention to provide a new power steering attenuation hose construction having one or more of the novel features of this invention as set forth above or hereinafter shown or described.

Another object of this invention is to provide a new method of making such a power steering attenuation hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view of a new power steering attenuation hose construction of this invention.

FIG. 2A is an enlarged fragmentary cross-sectional view taken substantially on the lines 2A—2A of FIG. 1.

FIG. 2B is an enlarged fragmentary cross-sectional view taken on lines 2B—2B of FIG. 1.

FIG. 3 is a perspective view of another new power steering attenuation hose construction of this invention.

FIG. 4 is an enlarged fragmentary cross-sectional view taken on line 4—4 of FIG. 3, FIG. 4 being shown in straight form rather than the bent form illustrated in FIG. 3.

FIG. 5 is an enlarged fragmentary cross-sectional view taken on line 5—5 of FIG. 3 and is also shown in straight form in FIG. 5 rather than in bent form as illustrated in FIG. 3.

DESCRIPTION OF THE PREFERRED EMBODIMENTS

While the various features of this invention are hereinafter illustrated and described as providing power steering attenuation hose constructions of various configurations, it is to be understood that the various features of this invention can be used singly or in any combination thereof to provide a power steering attenuation hose construction having any other configuration as desired.

Therefore, this invention is not to be limited to only the embodiments illustrated in the drawings, because the drawings are merely utilized to illustrated one of the wide variety of uses of this invention.

Referring now to FIGS. 1, 2A and 2B, a new power steering attenuation hose construction of this invention is generally indicated by the reference numeral 20 and comprises an outer flexible hose means 21 formed of any suitable polymeric material as is well known in the power steering hose art and has an inlet end 22 and an outlet end 23 with a metallic tubular restrictor, means 24 being disposed in the outer hose means 21 and dividing the interior 25 of the outer hose means 21 into an inlet chamber 26 and an outlet chamber 27 that are interconnected together by a restricting passage 28 formed through the restrictor means 24.

A metallic inlet tube or conduit 29 has an end 30 thereof disposed in the inlet end 22 of the outer hose means 21 and is held therein by an outer cylindrical body portion or fitting 32 also formed of metallic material and having been inwardly crimped as illustrated in FIG. 2A to hold the inlet end 22 of the outer hose means 21 on the end 30 of the conduit 29 all in a manner well known in the art. For example, see the aforementioned U.S. patent to Klees, U.S. Pat. No. 3,323,305.

Similarly, a metallic outlet tube or conduit 33 has an end 34 thereof disposed in the outlet end 23 of the outer hose means 21 and being held thereon by an outer metallic cylindrical member or fitting 35 having been crimped to the end 23 in the manner illustrated in FIG. 2B, the inlet conduit 29 and the outlet conduit 33 forming part of a complete power steering arrangement (not shown) for passing the power steering fluid from a pump means of the power steering arrangement through the power steering attenuation hose construction 21 to the steering mechanism of a vehicle or the like all in the manner fully disclosed in the aforementioned patent to Klees, U.S. Pat. No. 3,323,305 whereby it is believed only necessary to describe the structure of the new power steering attenuation hose construction 20 of this invention as the use thereof in a power steering mechanism need not be further described.

Accordingly, it can be seen in FIGS. 1 and 2A that a first flexible tuning cable means 36 that is formed of metallic material has one end 37 thereof crimped in an opening 38 of the end 30 of the inlet tube 29 so as to be fastened thereto and be in fluid communication therewith while another end 39 of the tuning cable means 36 has a cylindrical tubular end member 40 fastened thereon and providing an open outlet end 41 for the tuning cable means 36 which is spaced from an adjacent end 42 of the restrictor means 24 a distance that is indicated by the reference character S1 in FIG. 2A while the effective length of the first tuning cable means 36 in the inlet chamber 26 of the hose means 21 is represented by the reference character L1 in FIG. 2A.

Thus, it can be seen that the inlet chamber 26 of the hose construction 21 as illustrated in FIG. 2A has an annular chamber 43 surrounding the cable means 36 from the inlet end 37 thereof all the way to the open outlet end 41 thereof and then has a larger chamber 44 formed in the space between the outlet end 41 of the cable means 36 and the adjacent end 42 of the restrictor means 24.

As fully described in the aforementioned U.S. patent to Klees, U.S. Pat. No. 3,323,305, the length S1 of the space 44 at the outlet end 41 of the first tuning cable means 36 is approximately one inch and the effective length L1 of the cable means 36, in combination with the flexibility of the outer hose 21 and the annular space 43, is so selected that the inlet chamber 26 becomes a quarter wave reflector means that attenuates a certain primary order harmonic of the noise being created by the power steering fluid being pumped through the power steering hose construction 21. The inlet chamber means 26 also has been found to provide a three-quarter wave reflector means for a subsequent higher order harmonic of the noise as will be hereinafter described.

A second metallic flexible tuning cable means 45 similar to the first cable means 36 is disposed in the outlet chamber means 37 of the outer hose means 21 and has an inlet end 46 thereof disposed in an opening 47 in an end 48 of the restrictor means 24 and is held therein by the end 48 having been crimped thereto in a manner well known in the art whereby an open outlet end 49 of the cable means 45 is spaced from an adjacent end 50 of the outlet tube 33 a distance designated S2 in FIG. 2B which is also approximately one inch.

Thus, it can be seen that the second cable means 45 defines an annular chamber 51 in the outlet chamber 27 about the cable means 45 from its inlet end 46 to its open outlet end 49 which is defined by a metallic cylindrical open ended cap means 52 secured on an outlet end 53 of the cable means 45 in the same manner as the outlet cap 40 of FIG. 2A.

The outlet end 49 of the cable means 45 cooperates with the end surface 50 of the outlet conduit 33 to define a larger chamber 54 in the outlet chamber 27 whereby the effective length of the tuning cable means 45 is designated by the distance L2 in FIG. 2B.

It has been found that the second tuning cable means 45 also provides a quarter wave reflector means that attenuates a higher order harmonic of the noise than the primary order harmonic that is attenuated by the first cable means 36 and also acts as a three-quarter wave reflector means for attenuating a subsequent higher order harmonic.

It has been found according to the teachings of this invention that by making the lengths L1 and L2 of the respective tuning cables 36 and 45 of a ratio of 2 to 1 together with making the restrictor passage 28 of the restrictor means 24 with a transverse cross-sectional area that is less than the transverse cross-sectional area of the openings passing through the tuning cable means 36 and 45, the first tuning cable means 36 can be tuned to attenuate a 10th order harmonic of the noise with the quarter wave reflector means thereof and the second tuning cable means 45 can be tuned to attenuate the 20th order harmonic of the noise with the quarter wave reflector means thereof while the first tuning cable means 36 with the three-quarter wave reflector means thereof will additionally attenuate the 30th order harmonic of the noise and the second tuning cable means 45 with the three-quarter wave reflector means thereof will additionaly attenuate the 60th order harmonic. Additional higher order harmonics of the noise may also be attenuated in a like manner by such a hose construction 21 of this invention.

For example, it is understood that the first cable means 36 will also alternate the 50th order harmonic of the noise with the five-quarter wave reflector means thereof and the 70th order harmonic of the noise with the seven-quarter wave reflector means thereof, etc. The second tuning cable means 45 will also attenuate the 100th order harmonic of the noise with the five-quarter wave reflector means thereof and the 140th order harmonic of the noise with the seven-quarter wave reflector means thereof, etc.

It was found in one working embodiment of this invention that the length L1 can be approximately six inches and the length L2 can be approximately four inches. In another working embodiment of this invention the length L1 is approximately fifteen inches and the length L2 is approximately nine inches. In both working embodiments, the internal diameter of the restrictor passage means 28 is approximately 4.24 mm and the internal diameter of the tuning cable means 36 and 45 is approximately 5.75 mm while the outside diameter of the tuning cable means 36 and 45 is approximately 7.55 mm.

In addition, it has been found that when the ratio of the length L1 to the length L2 is approximately 3 to 2, the first tuning cable means with the quarter wave reflector means thereof attenuates the 20th order harmonic of the noise and the second tuning cable means with the quarter wave reflector means thereof attenuates the 30th order harmonic of the noise. The first tuning cable means in such 3 to 2 ratio also attenuates the 60th order harmonic of the noise with the three-quarter wave reflector means thereof and the second cable means also attenuates the 90th order harmonic of the noise with the three-quarter wave reflector means thereof.

A working embodiment of this invention with the 2 to 1 ratio has a length L1 of approximately eleven inches and a length L2 of approximately five and one-half inches. Another working embodiment of this invention with the 2 to 1 ratio has the length L1 of approximately ten inches and the length L2 of approximately five inches.

In particular, the embodiment where L1 is ten inches and L2 is five inches is illustrated in FIGS. 3–5 and comprises a power steering attenuation hose construction of this invention that is generally indicated by the reference numeral 20' and the parts thereof that are similar to the parts of the power steering attenuation hose construction 20 of FIGS. 1, 2A and 2B are indicated by like reference numerals followed by a prime mark.

As illustrated in FIGS. 3–5, the power steering attenuation hose construction 20' of this invention comprises an outer flexible hose means 21' that is formed from two separate flexible outer hoses 55A and 55B respectively having inlet ends 56 and 57 and outlet ends 58 and 59, the outlet end 58 of the first flexible hose 55A being fluidly interconnected to an inlet end 60 of a metallic tube or conduit 61 that has an outlet end 62 thereof interconnected to the restrictor means 24' that is disposed in the inlet end 57 of the second hose 55B and fastened thereto by a fitting 63 in the same manner as the fittings 32 and 35 previously described.

However, the end 62 of the conduit 61 in the working embodiment of this invention is directly interconnected to the second hose 55B by a fitting similar to the fitting 32 without having the restrictor means 24'. In fact it is believed that if a restrictor means 24' is used, the same could be at the outlet end of the first hose 55A, if desired. Thus, the tube 61 itself may function similar to a restriction means by dividing the hose construction 20' into the separate chambers 26' and 27'.

Similarly, the fitting 32' fastens the inlet conduit means 29' to the inlet end 56 of the first hose 55A while a similar fitting 64 fastens the inlet end 60 of the tube 61 to the outlet end 58 of the first hose 55. Also, the fitting 35' fastens the outlet end 59 of the second hose 55B to the outlet conduit means or pipe 33'.

In order to have the power steering attenuation hose construction 20' be positioned in assembled relation with a vehicle structure having a particular configuration, the hose construction 20' is bent into the particular shape illustrated in FIG. 3 wherein the first hose means 55A and second hose means 55B, as well as the interconnecting conduit 61 have bent configurations (even though shown in straight form in FIGS. 4 and 5 to facilitate the viewing thereof). Thus, it can be seen that the hose constructions 20 and 20' of this invention can be bent into various configurations thereof and will still function in the manner previously described.

In any event, it can be seen in FIGS. 4 and 5, that the first hose 55A has a first tuning cable means 36' disposed therein and having an effective length L1' while the open end means 41' thereof is spaced from an end surface 65 of the inlet end 60 of the conduit 61 a distance S1' which is approximately one inch.

Similarly, the second hose 55B has a second tuning cable means 45' disposed therein and having an effective length L2' so that the free end 49' of the second tuning cable means 45' is spaced from the end 50' of the outlet conduit means 33' by a distance S2' which is also approximately one inch.

The lengths L1' and L2' provide a ratio of approximately 2 to 1 as the length L1' in the embodiment of FIGS. 3–5 is approximately ten inches and the length L2' thereof is approximately five inches.

Therefore, it can be seen that each power steering attenuation hose construction of this invention has two open ended tuning cables in series with a restrictor means disposed therebetween that has a restricting passage with a cross-sectional area that is less than the cross-sectional areas through the two tuning cable means so that the two chambers receiving the respective tuning cable means are effectively divided from each other by the restrictor means in such a manner that the first chamber means will attenuate a primary order harmonic of the noise with the quarter wave reflector means thereof and the second chamber means will attenuate a certain higher order harmonic of the noise with the quarter wave reflector means thereof.

It can also be seen that the power steering fluid in the hose construction 20 previously described will be forced through the inlet conduit 29 and cable means 36 to exit out of the open end 41 thereof into the first chamber 25 and then pass through the passage 28 of the restrictor means 24 into the second tuning cable means 45 to exit out of the open end 49 thereof to fill the second chamber means 25 and then exit out through the outlet pipe or conduit 33 while having the noise thereof attenuated in the manner previously described.

Similarly, it can be seen in FIGS. 3–5 that the power steering fluid passes from the inlet pipe 29' through the first tuning cable means 36' to fill the first chamber 43' and then exit through the conduit 61 of the restrictor means 24' to pass through the restrictor means 24' into the second tuning cable means 45' to exit out of the open end 49' thereof and fill the second chamber means 27' before exiting out of the outlet conduit 33' while having the noise thereof attenuated in the manner previously described.

Therefore, it can be seen that this invention not only provides a new power steering attenuation hose construction, but also this invention provides a new method of making such a power steering attenuation hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a power steering attenuation hose construction comprising an outer flexible hose means having an inlet end and an outlet end, restrictor means disposed in said outer hose means and dividing the interior of said outer hose means into an inlet chamber and an outlet chamber interconnected together by said restrictor means, each of said chambers having an inlet end and an outlet end, a first flexible tuning cable means being interconnected to said inlet end and being disposed in said inlet chamber, and a second flexible tuning cable means being interconnected to said restrictor means and being disposed in said outlet chamber, each of said tuning cable means having an open outlet end spaced from said outlet end of its respective chamber, the improvement wherein the ratio of the effective length of said first tuning cable means to the effective length of said second tuning cable means results in a quotient that is approximately 3 to 2 or higher.

2. A hose construction as set forth in claim 1 wherein said restrictor means has an inlet portion and an outlet portion interconnected together by a restricting portion that has a transverse cross-sectional area that is smaller than the transverse cross-sectional area of the interior of each of said tuning cable means.

3. A hose construction as set forth in claim 2 wherein one of said inlet portion and said outer portion of said restrictor means comprises a relatively long tubular member.

4. A hose construction as set forth in claim 3 wherein said outer flexible hose means comprises two separate flexible hoses being spaced from each other by said long tubular member, one of said two flexible hoses having said inlet chamber therein and the other of said two flexible hoses having said outlet chamber therein.

5. A hose construction as set forth in claim 2 wherein said cross-sectional area of the interior of each of said tuning cable means has a given internal diameter and said smaller transverse cross-sectional area of said restricting portion has an internal diameter which is smaller than said given diameter by a ratio the quotient of which is generally of the order of 1.3.

6. A hose construction as set forth in claim 5 wherein said quotient is approximately 1.356.

7. In a method of making a power steering attenuation hose construction comprising an outer flexible hose means having an inlet end and an outlet end, restrictor means disposed in said outer hose means and dividing the interior of said outer hose means into an inlet chamber and an outlet chamber interconnected together by said restrictor means, each of said chambers having an inlet end and an outlet end, a first flexible tuning cable means being interconnected to said inlet end and being disposed in said inlet chamber, and a second flexible tuning cable means being interconnected to said restrictor means and being disposed in said outlet chamber, each of said tuning cable means having an open outlet end spaced from said outlet end of its respective chamber, the improvement comprising the step of forming said tuning cable means so that the ratio of the effective length of said first tuning cable means to the effective length of said second tuning cable means results in a quotient that is approximately 3 to 2 or higher.

8. A method of making a hose construction as set forth in claim 7 and comprising the step of forming said inlet chamber and said first tuning cable means to cooperate together to form a one-quarter wave reflector that is adapted to attenuate a 10th order harmonic.

9. A method of making a hose construction as set forth in claim 8 and comprising the step of forming said outlet chamber and said second tuning cable means to cooperate together to form a one-quarter wave reflector that is adapted to attenuate a 20th order harmonic.

10. A method of making a hose construction as set forth in claim 7 and comprising the step of forming said inlet chamber and said first tuning cable means to cooperate together to form a one-quarter wave reflector that is adapted to attenuate a 20th order harmonic.

11. A method of making a hose construction as set forth in claim 10 and comprising the step of forming said outlet chamber and said second tuning cable means to cooperate together to form a one-quarter wave reflector that is adapted to attenuate a 30th order harmonic.

* * * * *